US011844034B2

(12) United States Patent
Lee et al.

(10) Patent No.: US 11,844,034 B2
(45) Date of Patent: Dec. 12, 2023

(54) METHOD AND APPARATUS FOR TRANSMITTING AND RECEIVING SIGNAL IN FREQUENCY-ASYNCHRONOUS NON-ORTHOGONAL MULTIPLE ACCESS SYSTEM

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Kwonjong Lee, Suwon-si (KR); Hakkeon Lee, Seoul (KR); Insik Jung, Seoul (KR); Daesik Hong, Seoul (KR); Hyojin Lee, Suwon-si (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 125 days.

(21) Appl. No.: 17/390,146

(22) Filed: Jul. 30, 2021

(65) Prior Publication Data
US 2022/0046560 A1 Feb. 10, 2022

(30) Foreign Application Priority Data
Aug. 6, 2020 (KR) .......................... 10-2020-0098800

(51) Int. Cl.
*H04W 56/00* (2009.01)
*H04L 25/02* (2006.01)
(Continued)

(52) U.S. Cl.
CPC ......... *H04W 56/001* (2013.01); *H04L 5/0048* (2013.01); *H04L 25/0202* (2013.01); *H04W 24/08* (2013.01)

(58) Field of Classification Search
None
See application file for complete search history.

(56) References Cited

U.S. PATENT DOCUMENTS

2004/0174812 A1\* 9/2004 Murakami ............ H04L 5/0044
370/215
2007/0004337 A1\* 1/2007 Biswas ............... H04L 27/2695
455/303

(Continued)

FOREIGN PATENT DOCUMENTS

| KR | 10-2016-0124223 A | 10/2016 |
| KR | 10-2017-0021306 A | 2/2017 |
| WO | 2017/188548 A1 | 11/2017 |

*Primary Examiner* — Gregory B Sefcheck
*Assistant Examiner* — Suk Jin Kang
(74) *Attorney, Agent, or Firm* — Jefferson IP Law, LLP

(57) ABSTRACT

The disclosure relates to post-4$^{th}$ generation (4G) communication systems, such as 5$^{th}$ generation (5G) or 6$^{th}$ generation (6G), which support a higher data rate than the long term evolution (LTE) or 4G communication systems. A method and an apparatus for transmitting and receiving signals in a frequency-asynchronous non-orthogonal multiple access (FA-NOMA) communication system are provided. The method for transmitting a signal by a base station in an FA-NOMA system includes determining a frequency offset to be applied to a first signal transmitted to a first user equipment (UE) based on a second signal transmitted to a second UE, determining information for interference caused by the frequency offset, determining at least one pre-processing factor for the first UE based on the information for the interference, and transmitting a third signal including at least one first pilot to the first UE using the at least one (Continued)

pre-processing factor. The second signal includes at least one second pilot.

10 Claims, 10 Drawing Sheets

(51) Int. Cl.
*H04W 24/08* (2009.01)
*H04L 5/00* (2006.01)

(56) References Cited

U.S. PATENT DOCUMENTS

| | | | | |
|---|---|---|---|---|
| 2007/0263734 | A1* | 11/2007 | Seki | H04L 5/0048 375/259 |
| 2010/0260284 | A1* | 10/2010 | Yoshii | H04L 27/2607 375/295 |
| 2011/0013729 | A1* | 1/2011 | Yuba | H04L 27/2613 375/329 |
| 2011/0110445 | A1* | 5/2011 | Sameer | H04L 27/2686 375/260 |
| 2011/0255637 | A1* | 10/2011 | Murakami | H04L 5/0007 375/299 |
| 2011/0305286 | A1* | 12/2011 | Shimezawa | H04L 27/2646 375/295 |
| 2013/0242755 | A1* | 9/2013 | Seki | H04L 5/0051 370/242 |
| 2015/0312074 | A1 | 10/2015 | Zhu et al. | |
| 2017/0155484 | A1 | 6/2017 | Kang et al. | |
| 2017/0264477 | A1* | 9/2017 | Qu | H04L 27/2637 |
| 2018/0351718 | A1* | 12/2018 | Murakami | H04L 5/0048 |
| 2019/0260526 | A1* | 8/2019 | Zhang | H04L 27/0014 |
| 2019/0356423 | A1* | 11/2019 | Lee | H04L 5/0023 |
| 2019/0393998 | A1* | 12/2019 | Lei | H04W 72/00 |
| 2020/0389870 | A1 | 12/2020 | Shin et al. | |
| 2021/0135825 | A1* | 5/2021 | Pan | H04L 5/0005 |

* cited by examiner

METHOD AND APPARATUS FOR TRANSMITTING AND RECEIVING SIGNAL IN FREQUENCY-ASYNCHRONOUS NON-ORTHOGONAL MULTIPLE ACCESS SYSTEM

CROSS-REFERENCE TO RELATED APPLICATION(S)

This application is based on and claims priority under 35 U.S.C. § 119(a) of a Korean patent application number 10-2020-0098800, filed on Aug. 6, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Industry-Academic Cooperation Foundation, Yonsei University.

BACKGROUND

1. Field

The disclosure relates to a method and an apparatus for transmitting and receiving signals in a frequency-asynchronous non-orthogonal multiple access (FA-NOMA) system.

2. Description of Related Art

Wireless communication technologies have been developed mainly for human services, such as voice, multimedia, and data communication. As $5^{th}$-generation (5G) communication systems are commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the $6^{th}$-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (μsec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

In 4G communication systems and 5G communication systems, synchronization between signals in frequency and time axis has been considered as an essential element in system performance. However, to achieve a higher data rate than before, studies on intentionally generating an offset in the frequency axis and the time axis are in progress. In particular, the FA-NOMA system, which operates on a multi-carrier basis, such as the OFDM system, may enhance the transmission capacity based on an intentional frequency offset between UEs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting and receiving signals in an FA-NOMA system.

Another aspect of the disclosure is to provide a method and an apparatus for transmitting and receiving signals for channel estimation in an FA-NOMA system using a frequency offset.

Another aspect of the disclosure is to provide a method and apparatus used for channel estimation and measurement of a downlink in an FA-NOMA system using a frequency offset.

Another aspect of the disclosure is to provide a method for transmitting and receiving signals for channel estimation in an FA-NOMA system.

Another aspect of the disclosure is to provide a method for designing a pilot signal by expecting (intrinsic) interference due to a frequency offset in an FA-NOMA system and a method for applying pre-processing to transmission signals to prevent the intrinsic interference from affecting the pilots of other UEs.

Another aspect of the disclosure is to provide a method for refraining from generating a frequency offset for OFDM symbols which transmit pilots to prevent interference due to a frequency offset.

Additional aspects will be set forth in part in the description which follows and, in part, will be apparent from the description, or may be learned by practice of the presented embodiments.

In accordance with an aspect of the disclosure, a method for transmitting a signal by a base station in a frequency-asynchronous non-orthogonal multiple access (FA-NOMA) system using a frequency offset is provided. The method includes determining a frequency offset to be applied to a first signal transmitted to a first user equipment (UE) based on a second signal transmitted to a second UE, determining information for interference caused by the frequency offset, determining at least one pre-processing factor for the first UE based on the information for the interference, and transmitting a third signal including at least one first pilot to the first UE using the at least one pre-processing factor. The second signal includes at least one second pilot.

The frequency offset may be less than or equal to 0.5 times a preset subcarrier spacing.

The information for the interference may include information for interference caused by the first signal to which the frequency offset is applied, with respect to the at least one second pilot included in the second signal.

The at least one pre-processing factor may be a factor determined to prevent interference to the at least one second pilot caused by the first signal to which the frequency offset is applied.

The method may further comprise broadcasting the at least one pre-processing factor through a control channel.

Broadcasting the at least one pre-processing factor through the control channel may comprise broadcasting at least one of subcarrier index information for the at least one first pilot, information for the frequency offset, information for a total number of subcarriers, and information for elements of a matrix representing the at least one pre-processing factor.

In accordance with another aspect of the disclosure, a method for receiving a signal by a first UE in an FA-NOMA system is provided. The method includes receiving a signal including at least one pilot from a base station, estimating a channel based on the at least one pilot, demodulating a second signal transmitted to a second UE based on the received signal, obtaining a first signal transmitted to the first UE by removing the demodulated second signal from the received signal, generating a frequency offset compensated signal by performing frequency offset compensation on the first signal, generating a post-processed signal by performing post-processing on the frequency offset compensated signal using at least one post-processing factor, and obtaining a demodulated signal by demodulating the post-processed signal. The at least one post-processing factor is determined based on at least one pre-processing factor received from the base station.

In accordance with another aspect of the disclosure, a base station in an FA-NOMA system is provided. The base station includes a transceiver and at least one processor configured to determine a frequency offset to be applied to a first signal transmitted to a first user equipment (UE) based on a second signal transmitted to a second UE, determine information for interference caused by the frequency offset, determine at least one pre-processing factor for the first UE based on the information for the interference, and control the transceiver to transmit a third signal including at least one first pilot to the first UE using the at least one pre-processing factor. The second signal may include at least one second pilot.

In accordance with another aspect of the disclosure, a first UE in an FA-NOMA system is provided. The first UE includes a transceiver and at least one processor configured to control the transceiver to receive a signal including at least one pilot from a base station, estimate a channel based on the at least one pilot, demodulate a second signal transmitted to a second UE based on the received signal, obtain a first signal transmitted to the first UE by removing the demodulated second signal from the received signal, generate a frequency offset compensated signal by performing frequency offset compensation on the first signal, generating a post-processed signal by performing post-processing on the frequency offset compensated signal using at least one post-processing factor, and obtain a demodulated signal by demodulating the post-processed signal. The at least one post-processing factor may be determined based on at least one pre-processing factor received from the base station.

According to various embodiments of the disclosure, it is possible to enhance the performance of receiving signals by each UE in an FA-NOMA communication system supporting a frequency offset.

According to various embodiments of the disclosure, a plurality of UEs may stably receive a pilot symbol in an FA-NOMA system in which different intentional frequency offsets are applied between the respective data initiation symbols of the UEs that are then transmitted. Thus, the channel estimation performance of UEs may be enhanced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before detailing the disclosure, some terms as used herein may be interpreted as follows, for example. However, it should be noted that the disclosure is not limited thereto.

The base station is an entity communicating with a UE and may be denoted a BS, a nodeB (NB), an eNodeB (eNB), or an access point (AP).

The terminal is an entity communicating with a base station and may be denoted a user equipment (UE), a mobile station (MS), a mobile equipment (ME), a device, or a terminal.

Various embodiments of the disclosure relate to a non-orthogonal multiple access system using an intentional frequency offset and, in particular, to a method and an apparatus for transmitting and receiving signals for channel estimation in a frequency-asynchronous non-orthogonal multiple access (FA-NOMA) system.

Figure 1:
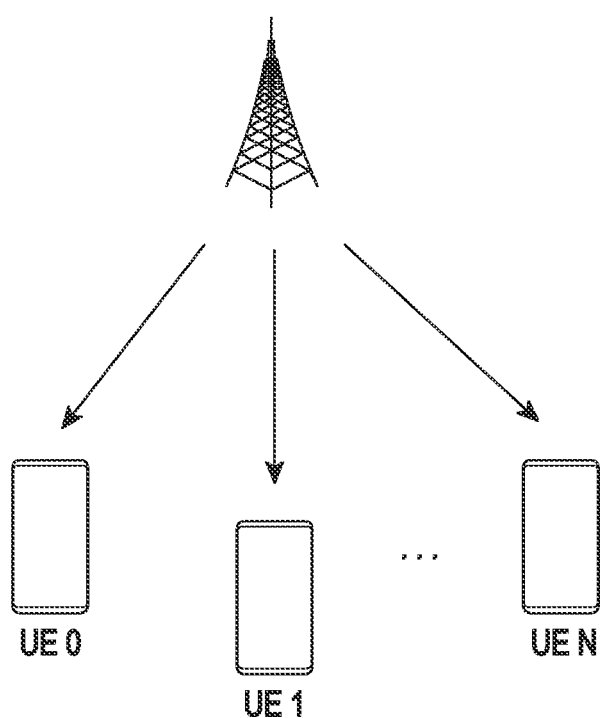
FIG. 1 is a view illustrating a frequency-asynchronous non-orthogonal multiple access (FA-NOMA) system using an intentional frequency offset according to an embodiment of the disclosure.

FIG. 1 is a view illustrating an FA-NOMA system using an intentional frequency offset according to an embodiment of the disclosure.

Referring to FIG. 1, it illustrates downlinks in which multiple UEs (e.g., UE 0, UE 1, . . . , and UE N) receive data from a base station. The base station may multiplex signals intended for the multiple UEs. A UE, commonly referred to as a terminal or mobile terminal, may be stationary or mobile, and may be, e.g., a cellular phone or a personal computer device. The base station, which is typically a stationary device, may be referred to as an AP or by a different equivalent term.

The downlink signals may include data signals containing information content, control signals containing downlink control information, and reference signals, such as pilot signals. The base station may transmit data information or downlink control information through physical downlink shared channels (PDSCHs) or physical downlink control channels (PDCCHs).

Hereinafter, an FA-NOMA system according to an embodiment will be compared with a non-orthogonal multiple access (NOMA) system of the related art.

Figure 2A:
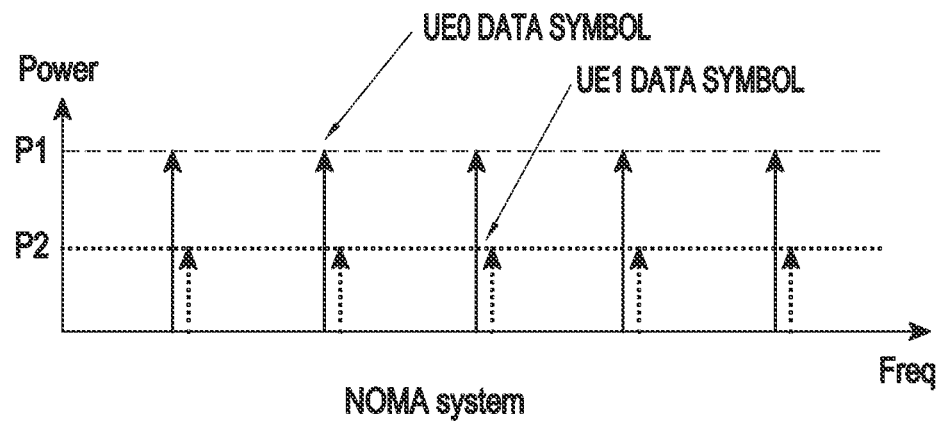
FIGS. 2A and 2B are views illustrating signals in a frequency domain, for a NOMA system of the related art and an FA-NOMA system using an intentional frequency offset according to an embodiment of the disclosure.
Figure 2B:
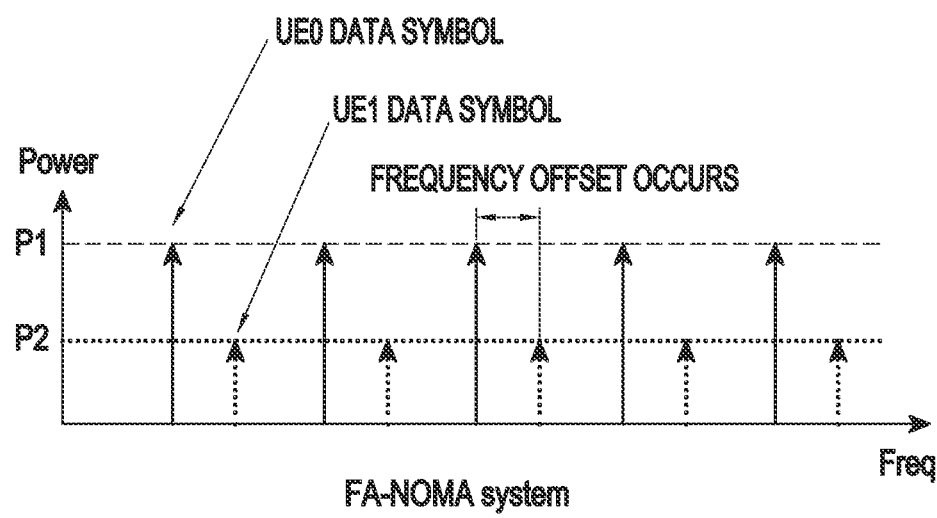

FIGS. 2A and 2B are views illustrating signals in a frequency domain, for a NOMA system of the related art and an FA-NOMA system using an intentional frequency offset according to an embodiment of the disclosure.

FIGS. 2A and 2B illustrate examples of frequency domain signals (e.g., data symbols) when the NOMA system and the FA-NOMA system are multi-carrier-based systems using five subcarriers and supporting two UEs (e.g., UE0 and UE1).

Specifically, FIG. 2A illustrates UE0 data symbols and UE1 data symbols in the NOMA system, and FIG. 2B illustrates UE0 data symbols and UE1 data symbols in the FA-NOMA system using an intentional frequency offset.

Referring to FIG. 2B, unlike the NOMA system, in the FA-NOMA system, a frequency offset corresponding to a fractional multiple of a subcarrier spacing may be generated between a UE0 data symbol and a UE1 data symbol. In other words, frequency offsets, which are smaller than the magnitude of the subcarrier spacing, from the UE0 data symbols including at least one pilot signal, may be applied to the UE1 data symbols, and the UE0 data symbols and the UE1 data symbols, two adjacent ones of which are superposed but are spaced apart by the frequency offset intentionally applied, may be transmitted from the base station to the UE0 and the UE1.

In contrast, in the NOMA system, as illustrated in FIG. 2A, no frequency offset may occur between the UE0 data symbol and the UE1 data symbol.

Referring to FIG. 2B, in the channel estimation method used in the NOMA system, if a pilot signal is embedded in a specific carrier in an orthogonal frequency division multiplexing (OFDM) symbol to be transmitted to one UE (e.g., UE0), no signal is embedded in the same subcarrier as the pilot signal-embedded specific subcarrier in the OFDM symbol for a different UE (e.g., UE1) than the UE (e.g., UE0), so that the subcarrier remains empty. In other words, among M subcarriers, $N_P$ subcarriers are used for pilot signals, and subcarriers in which pilot signals are transmitted for interference avoidance are not used for data transmission. Accordingly, the base station may transmit M-$N_P$ data symbols to each UE.

Referring to FIG. 2A, in the FA-NOMA system using a frequency offset, the base station may transmit signals, which are superposed, to the plurality of UEs. Before superposition, a frequency offset may be applied to the signals of each UE, and a different magnitude of the frequency offset may be set for each UE. The following two methods may be adopted to generate superposed signals for data symbols of the multiple UEs.

After inverse fast Fourier transform (IFFT) is performed, the frequency offset of each UE is reflected and the signals are then superposed.

Before IFFT is performed, the frequency offset generated by an offset generation method, such as cyclic convolution, is reflected, and the signals are then superposed.

For convenience of description, an example in which superposed signals are generated based on the second method is described below. However, the following description does not exclude the first method for generating superposed signals, but may encompass the first method.

In the FA-NOMA system using a frequency offset described below, one OFDM symbol consisting of M subcarriers may be considered. The OFDM symbol may be used for pilot signal transmission for channel estimation. A reference UE to which no frequency offset is applied and another UE to which a frequency offset is applied may be considered.

Although the FA-NOMA system using a frequency offset includes two UEs as described below, embodiments of the disclosure are not limited thereto. In other words, the FA-NOMA system using a frequency offset may include three or more UEs, and in this case, a reference UE to which no frequency offset is applied and two or more other UEs, to which a frequency offset is applied, may be considered. Various embodiments of the disclosure described below may be implemented in the same manner in an FA-NOMA system including three or more UEs.

The frequency offset intentionally generated in the FA-NOMA system may cause interference that does not occur according to the related art. Such interference may affect the transmission/reception process performed between the base station and the UE. In particular, when the OFDM scheme is used, inter-carrier interference (ICI) may be caused.

Accordingly, if a channel estimation method of the related art is used in the FA-NOMA system, pilot contamination may occur due to intrinsic interference caused by the intentionally generated frequency offset. The degree of pilot contamination may be more than half of the magnitude of the pilot. Accordingly, use of a channel estimation method of the related art may significantly reduce channel estimation performance.

According to an embodiment of the disclosure, the channel estimation method described below may consider the following characteristics of interference occurring in the FA-NOMA system.

In FA-NOMA, the interference pattern (interference information, interference matrix or interference vector) caused by intentional frequency offset is determined by the degree of offset and transmitted data.

In the downlink FA-NOMA system, since the base station is already aware of the transmission data and the intentionally generated frequency offset, the base station may previously calculate how the interference caused by the intentional frequency offset will occur.

The magnitude of the interference, with the pilot, of the transmission data signal of the UE, which transmits no pilot, is proportional to the magnitude of the offset for offsets whose magnitude is 0.5 times or less of the interval between subcarriers.

Various embodiments of the disclosure may remove an influence of interference generated on a downlink pilot signal due to an intentional frequency offset or may reduce interference.

The following three methods may be used for channel estimation in the FA-NOMA system, using the above-described features. Since each method has its own advantages and disadvantages, different channel estimation methods may be used depending on the environment of the wireless communication system.

A method for designing a pilot for channel estimation in the FA-NOMA system

A method for pre-processing transmission signals for channel estimation in the FA-NOMA system A method for designing a frame structure for interference avoidance 1. A Method for Designing a Pilot for Channel Estimation in the FA-NOMA System A first method for channel estimation in the FA-NOMA system is to design a pilot symbol considering interference caused by a frequency offset.

Figure 3:
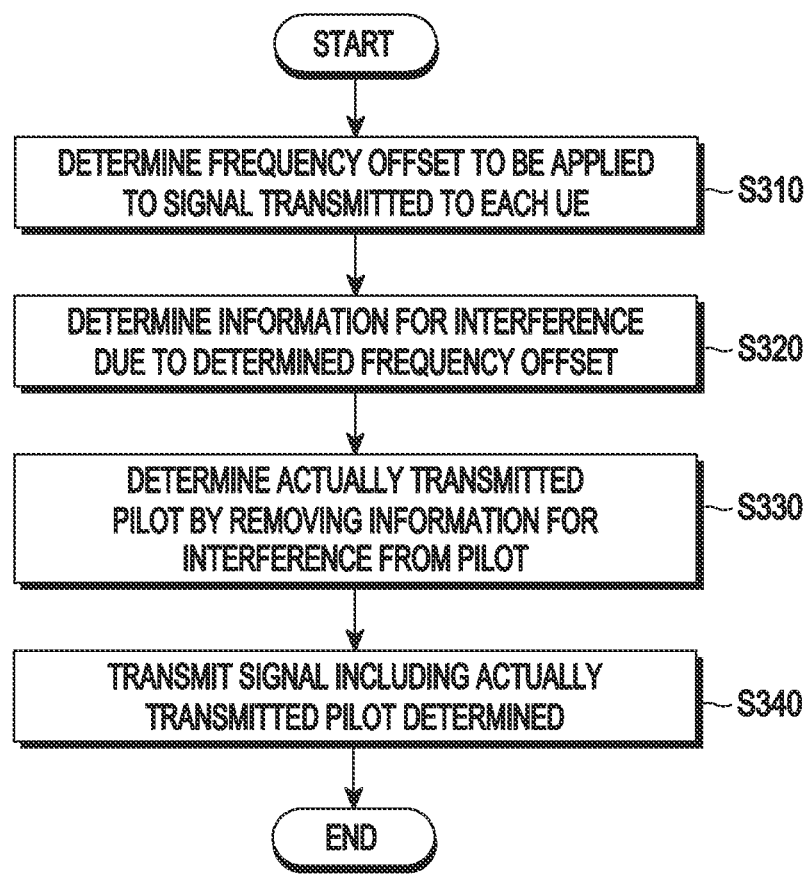
FIG. 3 is a flowchart illustrating a method for a base station to transmit a signal in an FA-NOMA system using a frequency offset according to an embodiment of the disclosure.

FIG. 3 is a flowchart illustrating a method for a base station to transmit a signal in an FA-NOMA system using a frequency offset according to an embodiment of the disclosure.

Referring to FIG. 3, the base station may determine a frequency offset to be applied to a signal transmitted to each UE at operation S310.

The base station may determine information for interference by the determined frequency offset. For example, the base station may apply the determined frequency offset to the transmission signal of each UE, thereby determining information for interference affecting at least one pilot symbol at operation S320. As mentioned above, in the downlink, the base station knows both the data transmitted to each UE and the intentionally generated frequency offset. Thus, the base station may calculate and obtain the interference vector (interference information or interference matrix) which is caused by the data symbol of each UE, using the data and frequency offset, before transmitting a signal to each UE. In other words, the base station may previously calculate and obtain the information for interference with the pilot symbol by the frequency offset-applied data symbol transmitted to each UE.

The accuracy of the interference vector g affecting the pilot symbol is varied depending on the accuracy index (e.g., optimal number) that indicates how much the data symbol, as an interference source, is used to obtain the information. As the accuracy index approaches the full fast Fourier transform (FFT) size, the accuracy increases, but generation of the interference vector g becomes more complicated. As the accuracy index decreases relative to the full FFT size, the accuracy reduces, but generation of the interference vector g becomes less complicated. Accordingly, the accuracy index may be appropriately selected according to system performance.

The base station may determine the actually transmitted pilot symbol by removing information for interference from the pilot symbol at operation S330. The pilot symbol may be represented as in Equation 1 below using the interference vector g.

$$x_p = -g + p_{boost} s_p \qquad \text{Equation 1}$$

In Equation 1, p denotes the index of the pilot symbol, $x_p$ denotes the pth pilot symbol that is actually transmitted, and $s_p$ denotes the pth pilot symbol used for channel estimation.

The proposed pilot symbol is generated by previously removing g from the actual pilot symbol $s_p$. When a pilot symbol is generated by removing the interference vector g, the size of the pilot symbol used for actual channel estimation is reduced compared to the prior pilot symbol. Therefore, to compensate for the reduced size of the pilot symbol, the power of the pilot symbol without the interference vector g may be increased by $p_{boost}$ (power boost). The magnitude of the power boost may be appropriately adjusted according to the base station performance or the system environment.

The base station may transmit a signal including the determined pilot symbol, which is to be actually transmitted, to the UEs at operation S340.

Figure 4:
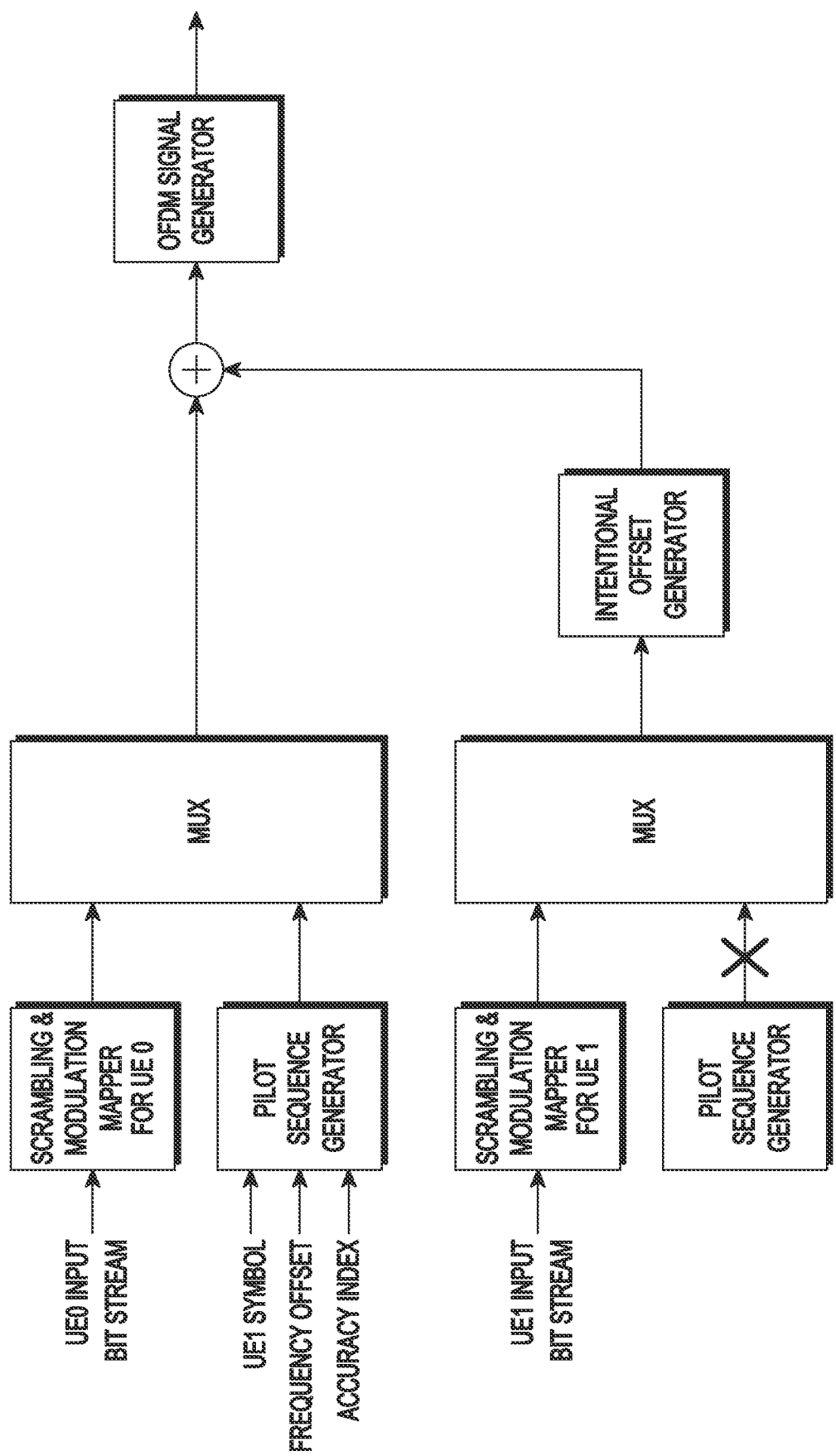
FIG. 4 is a block diagram illustrating a base station in an FA-NOMA system using a frequency offset according to an embodiment of the disclosure.

FIG. 4 is a block diagram illustrating a base station in an FA-NOMA system using a frequency offset according to an embodiment of the disclosure.

Referring to FIG. 4, UE0 is a UE for which no offset is used, and UE1 is a UE for which an offset is used. Accordingly, no offset may be applied to the transmission signal of UE0, and an offset may be applied to the transmission signal of UE1.

A bit-constellation mapper (scrambling & modulation mapper for UE0) may generate a UE0 symbol using a UE0 input bit stream. The bit-constellation mapper (scrambling & modulation mapper for UE1) may generate a UE1 symbol using a UE1 input bit stream.

When a pilot is embedded into an OFDM symbol to be currently transmitted, symbols output from the bit-constellation mapper and the pilot symbol generator may be input to a selector (MUX), and the pilot symbol and UE0 data symbol may be arranged according to the pre-defined position of the pilot embedded. The output of the selector may be input to an IFFT block and converted into a time domain signal.

The pilot symbol generator (pilot sequence generator) may generate a pilot sequence using the UE1 symbol output from the bit-constellation mapper, frequency offset information, and accuracy index information. UE1 data symbol information, an intentionally generated frequency offset, and an accuracy index used to generate an interference vector may be input to the pilot symbol generator. The pilot symbol generator may generate an interference vector, which the intentional frequency offset applies to the pilot symbol included in UE0, based on the above information, and may output an interference vector-removed pilot symbol.

In other words, the pilot symbol generator may generate an interference vector affecting the pilot symbol of UE0 based on the symbol information for UE1, the frequency offset of UE1, and a preset accuracy index. The pilot symbol generator may generate a pilot symbol, which is to be actually transmitted, by removing the generated interference vector from the pilot symbol used for channel estimation included in UE0.

The generated UE0 symbol and the actually transmitted pilot symbol may be added to the frequency offset-applied UE1 symbol, and a signal including the UE0 symbol, the actually transmitted pilot symbol, and the frequency offset-offset UE1 may be input to the IFFT block and be converted into a time domain signal.

As such, in an FA-NOMA system including multiple UEs, in which different intentional frequency offsets are applied to data symbols transmitted to the multiple UEs, an interference signal for the pilot symbol generated as different intentional frequency offsets are applied to the data symbols of the UEs may be previously calculated, the calculated interference signal may be previously removed from the pilot symbol to be transmitted, and then, an interference signal-removed pilot symbol may then be transmitted.

By the above-described method, multiple UEs may stably receive pilot symbols in an FA-NOMA system in which different intentional frequency offsets are applied to data symbols of the UEs, and the data symbols are then transmitted. Thus, the channel estimation performance of UE may be enhanced.

2. A Method for Pre-Processing Transmission Signals for Channel Estimation in the FA-NOMA System.

A second method for channel estimation in the FA-NOMA system is to design a pre-processing matrix (pre-processing vector) for removing interference due to frequency offset.

Figure 5:
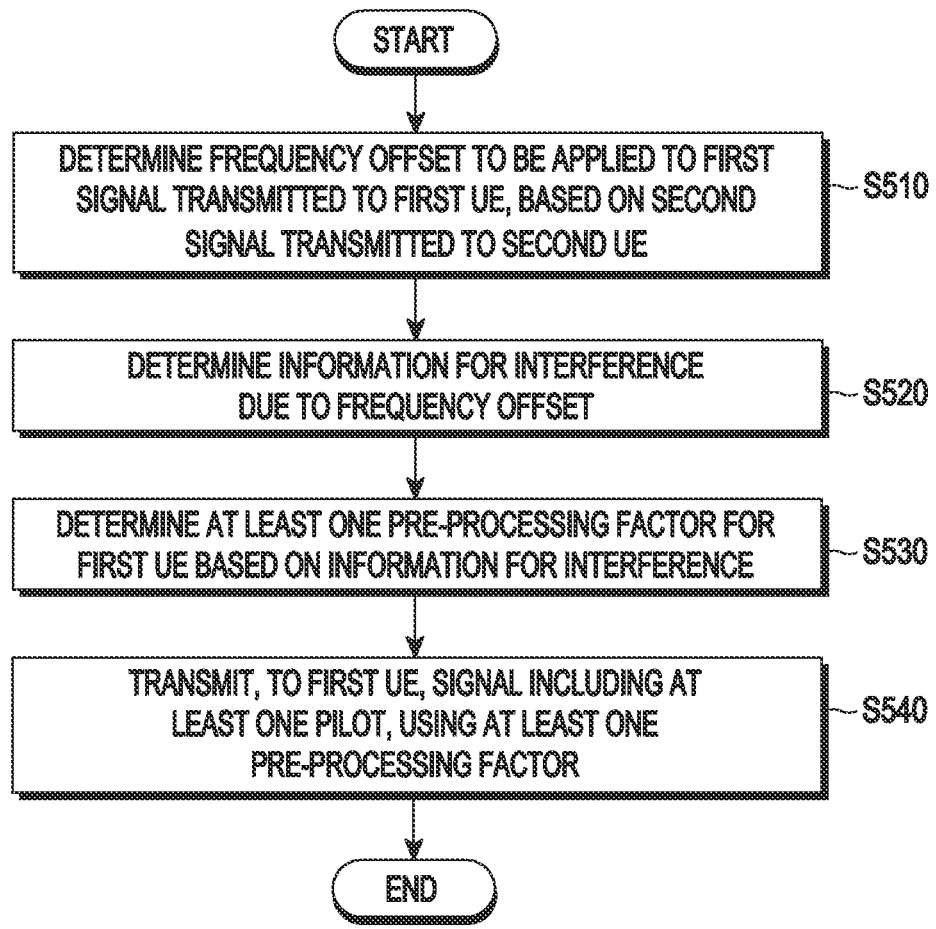
FIG. 5 is a flowchart illustrating a method for a base station to transmit a signal in an FA-NOMA system using a frequency offset according to an embodiment of the disclosure.

FIG. 5 is a flowchart illustrating a method for a base station to transmit a signal in an FA-NOMA system using a frequency offset according to an embodiment of the disclosure.

Referring to FIG. 5, a base station may determine a frequency offset to be applied to a first signal transmitted to a first UE based on a second signal transmitted to a second UE at operation S510. As described above, in the downlink, the base station may know both the data transmitted to each UE and the intentionally generated frequency offset. The frequency offset may have a magnitude not more than 0.5 times a preset subcarrier spacing. The subcarrier spacing may be determined by the base station, and the base station may determine the subcarrier spacing considering UEs.

The base station may identify information for interference due to offset based on the determined frequency offset at operation S520. The information for the interference may be information for the interference with the at least one pilot included in the second signal by the frequency offset-applied first signal.

At least one pre-processing factor for the first UE may be determined based on the information for the interference at operation S530. The at least one pre-processing factor may be a factor determined so that a vector operation is performed on the interference information not to cause interference with the at least one pilot. The at least one pre-processing factor may be a matrix having a null value by performing a matrix multiplication operation with the interference information.

In the FA-NOMA system considered according to an embodiment of the disclosure, the base station may superpose and transmit the signals of the multiple UEs. The signals of the multiple UEs may be signals that have been completely scrambled and modulated. A signal to be generated by the base station on the frequency axis may be expressed as illustrated in Equation 2 below.

$$y = s'_0 + s'_1 \qquad \text{Equation 2}$$

In Equation 2, $s'_0$ denotes a vector which has a length of M and in which the downlink pilot symbol and data symbol to be transmitted to UE0 have been multiplexed. Specifically, $s'_0$ denotes a vector in which a data symbol $s_0$ whose length is $M-N_P$ and a pilot symbol P whose length is $N_P$ has been multiplexed. $s'_1$ includes the data symbol $s_1$ to be transmitted to UE1 and may be determined based on Equation 3 below.

$$s'_1 = G \cdot C \cdot s_1 \qquad \text{Equation 3}$$

In Equation 3, $s'_1$ denotes a signal created as the data symbol $s_1$ to be transmitted to UE1 passes through at least one pre-processing factor (proposed pre-processing matrix C) and the intentional offset generator G.

The proposed pre-processing matrix may be a matrix for removing or mitigating interference caused by the UE1 data symbol to which a frequency offset has been intentionally applied to a pilot subcarrier position. Hereinafter, an index set (set) of pilot symbols is defined as $\{p_0, p_1, \ldots, p_{N_P-1}\}$. Here, the signal of UE1 causes inter-carrier interference (ICI) with the pilot symbol by the influence from the intentional offset generator G, and a pattern in which a corresponding interference signal is generated is as shown in Equation 4 below.

$$q = G_i \cdot s'_1, \quad G_i = \begin{bmatrix} g_1 \\ \vdots \\ g_{N_P} \end{bmatrix} \qquad \text{Equation 4}$$

In Equation 4, q denotes information (interference signal vector, interference signal matrix, or interference signal information) for interference having a length of $N_P$. $G_i$ denotes a matrix representing the interference pattern. Specifically, $G_i$ is a matrix resultant from leaving, in order, only rows corresponding to the pilot index set $\{p_0, p_1, \ldots, p_{N_P-1}\}$ among the rows of the offset generator matrix. Therefore, at least one pre-processing factor (the proposed pre-processing matrix C) is a matrix having base vectors of a null space, defined for the interference pattern matrix $G_i$, as its rows. At least one pre-processing factor (the proposed pre-processing matrix C) may include all schemes that may meet Equation 5.

$$G_1 \cdot C \cdot s'_1 = 0 \qquad \text{Equation 5}$$

Equation 5 may be established for an arbitrary transmit symbol vector $s'_1$.

Since the base station needs to share at least one pre-processing factor (proposed pre-processing matrix) with the user, the base station may transmit (broadcast) information therefor through a control channel. Here, the information to be broadcast may include index information for pilot subcarriers on the frequency axis, information for an intentional frequency offset applied to the signal to be transmitted to UE1, information for the total number of subcarriers, and index information for a pre-processing matrix previously agreed on between the transmit and receive ends. Further, the base station may transmit information obtained by quantizing the elements of the proposed pre-processing matrix through a control channel.

The base station may transmit a signal including at least one pilot to the first UE by using the at least one pre-processing factor at operation S540.

Figure 6:
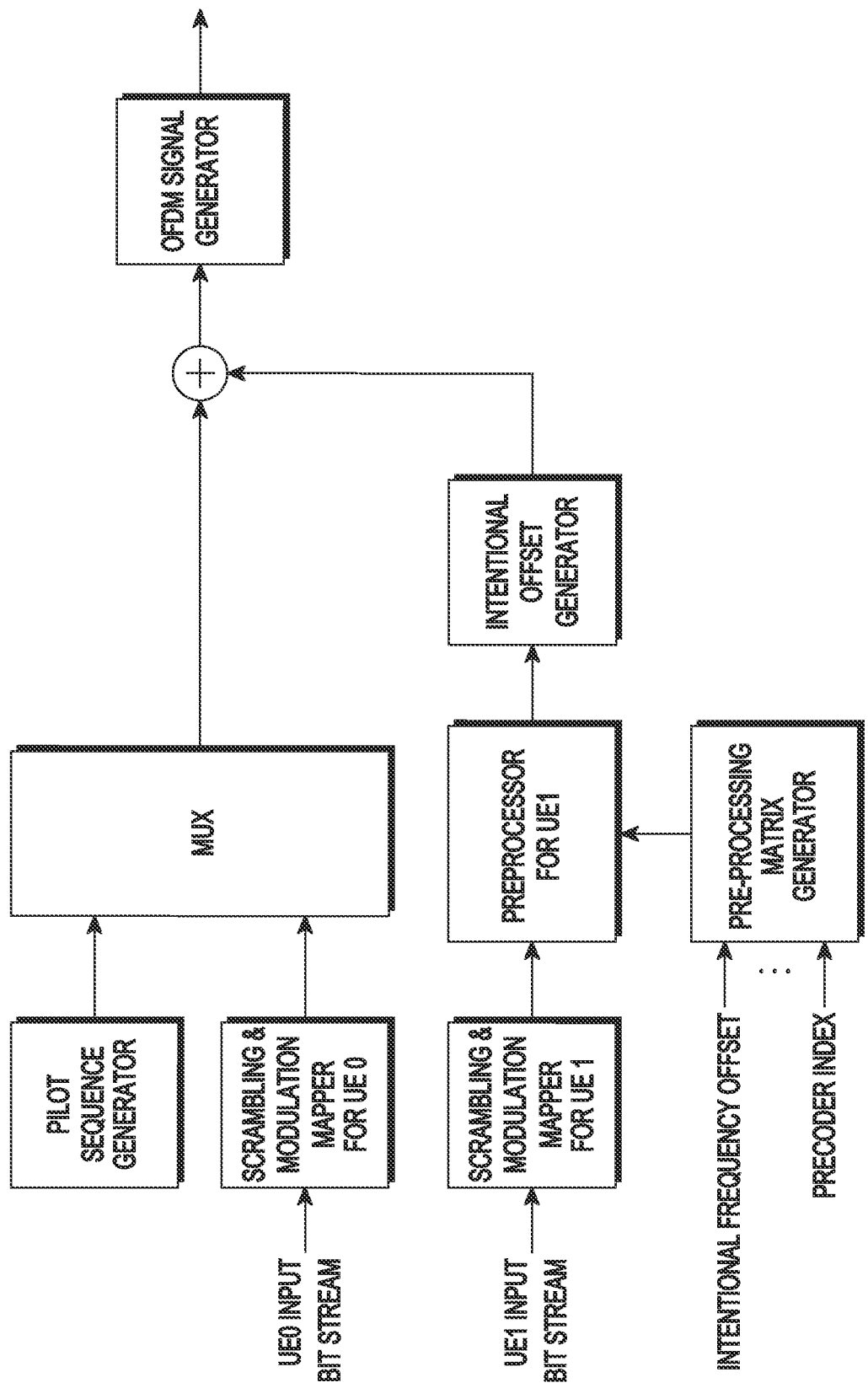
FIG. 6 is a block diagram illustrating a base station in an FA-NOMA system using a frequency offset according to an embodiment of the disclosure.

FIG. 6 is a block diagram illustrating a base station in an FA-NOMA system using a frequency offset according to an embodiment of the disclosure.

FIG. 6 illustrates operations of a base station when an FA-NOMA system supports two UEs. Referring to FIG. 6, UE0 is a UE for which no offset is used, and UE1 is a UE for which an offset is used. Accordingly, no offset may be applied to the transmission signal of UE0, and an offset may be applied to the transmission signal of UE1.

The bit-constellation mapper (scrambling & modulation mapper for UE0) may generate a UE0 symbol using a UE0 input bit stream. The bit-constellation mapper (scrambling & modulation mapper for UE1) may generate a UE1 symbol using a UE1 input bit stream.

The signal of UE1 that has generated the offset may be pre-processed so as not to interfere with the pilot positions of the other UE. The preprocessor for UE1 may perform pre-processing on the UE1 symbol using at least one pre-processing factor (pre-processing matrix) generated using the UE1 symbol, intentional frequency offset information applied to UE1, and a precoder index (index information for a pre-processing matrix previously agreed on between the transmit and receive ends). The interference information caused by the offset is interference information generated as a frequency offset is applied to the UE1 symbol and is interference information for the at least one pilot signal included in the transmission signal of UE0. The pre-processing matrix is a matrix determined to be vector-operated with the interference information caused by the offset so as to allow the interference information caused by the offset not to cause interference with the at least one pilot signal.

The controller of the base station may merge (multiplex or MUX) the generated pilot sequence and the UE0 symbol and add a pre-processed UE1 symbol, to which a frequency offset is intentionally applied by the intentional offset generator, to the merged (multiplexed) signals.

According to an embodiment of the disclosure, when multiple ports are supported, the proposed pre-processing matrix may be applied per antenna port. If the proposed pre-processing matrix is applied to each of the signal vectors to be transmitted to UE1 upon generating individual port signals before the multi-port signals are multiplexed, Equation 5 may be met.

Figure 7:
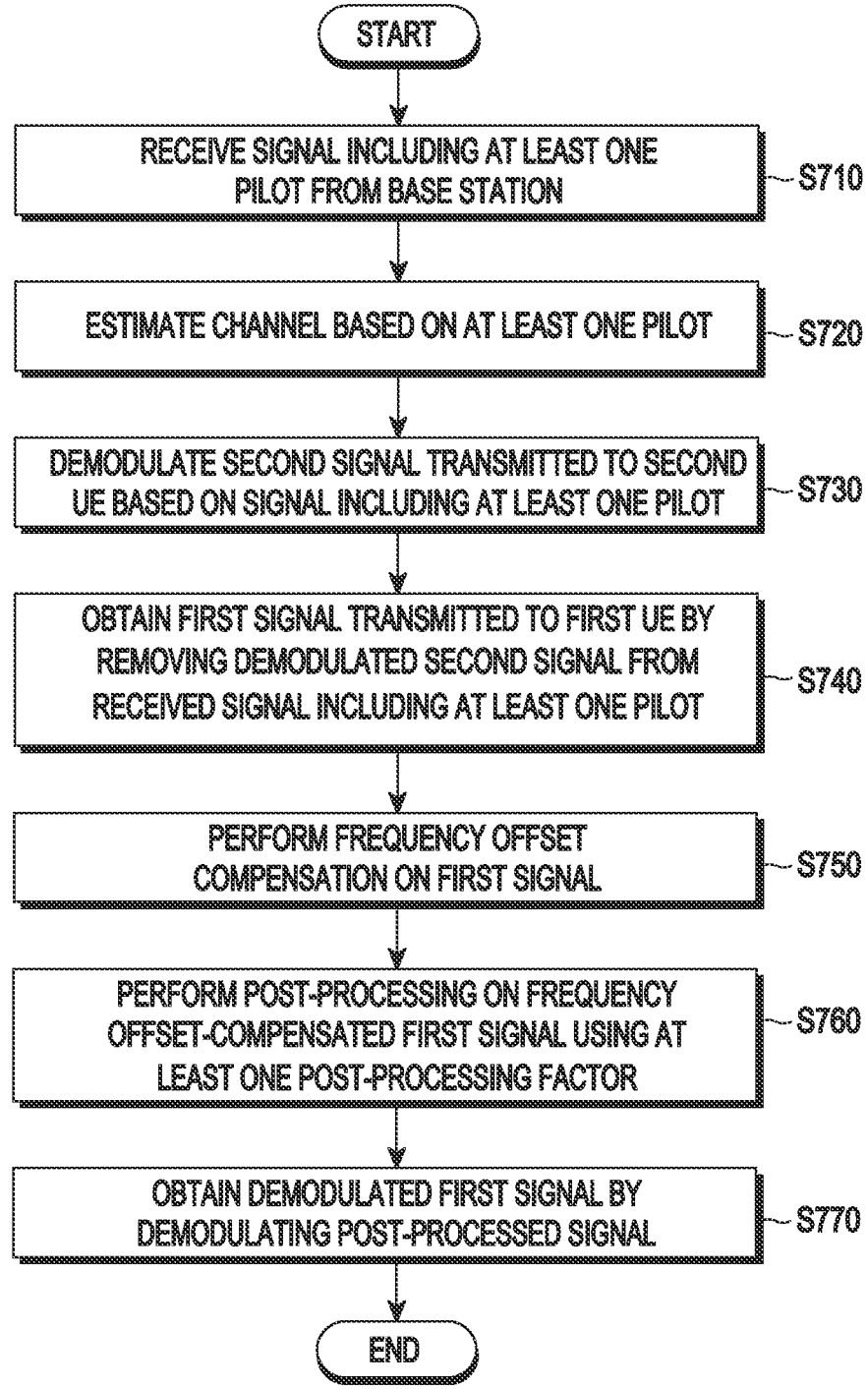
FIG. 7 is a flowchart illustrating a method for a UE to receive a signal in an FA-NOMA system using a frequency offset according to an embodiment of the disclosure.

FIG. 7 is a flowchart illustrating a method for a first UE to receive a signal in an FA-NOMA system using a frequency offset according to an embodiment of the disclosure.

Referring to FIG. 7, the first UE may receive a signal including at least one pilot from the base station at operation S710. The signal including at least one pilot may be a signal including data that is to be transmitted from the base station to each of the UEs and at least one pilot.

The first UE may estimate the channel based on the at least one pilot at operation S720. The first UE may estimate the channel that the base station transmits to each UE using at least one pilot.

The first UE may demodulate the second signal transmitted to the second UE based on the signal including the at least one pilot at operation S730. The first UE may estimate a transmission channel transmitted by the base station to the second UE using the at least one pilot, and the first UE may transmit the second signal transmitted to the second UE from the signal including the at least one pilot and demodulate the second signal.

The first UE may obtain the first signal transmitted to the first UE by removing the demodulated second signal from the received signal including the at least one pilot at operation S740. The first UE may obtain the first signal transmitted to the first UE by the method of removing the demodulated second signal from the received signal including the at least one pilot using the demodulated second signal.

The first UE may perform frequency offset compensation on the first signal at operation S750. The frequency offset may be a frequency offset that has a magnitude not more than 0.5 times a preset subcarrier spacing by the base station. The information for the frequency offset may be received from the base station. The first UE may perform offset compensation on the first signal using the information for the frequency offset received from the base station.

The first UE may perform post-processing on the frequency offset-compensated first signal using at least one post-processing factor at operation S760. The at least one post-processing factor may be a Hermitian matrix of the at least one pre-processing factor. The at least one pre-processing factor may be a factor determined so that a vector operation is performed on the interference information not to cause interference with the at least one pilot. The information for the interference may be information for interference with the at least one pilot by the frequency offset-applied post-processed signal as the frequency offset is applied to the post-processed signal while the base station transmits the signal. The at least one pre-processing factor may be a matrix having a null value by performing a matrix multiplication operation with the interference information. The first UE may receive the at least one pre-processing factor from the base station through a control channel. The first UE may further receive index information for pilot subcarriers, information for the frequency offset, information for the total number of subcarriers, or information obtained by quantizing the elements of the pre-processing matrix, together with the at least one pre-processing factor.

The first UE may obtain a demodulated first signal by demodulating the post-processed signal at operation S770. The first UE may demodulate the post-processed signal, thereby obtaining a demodulated first signal which is data transmitted from the base station to the first UE.

Figure 8:
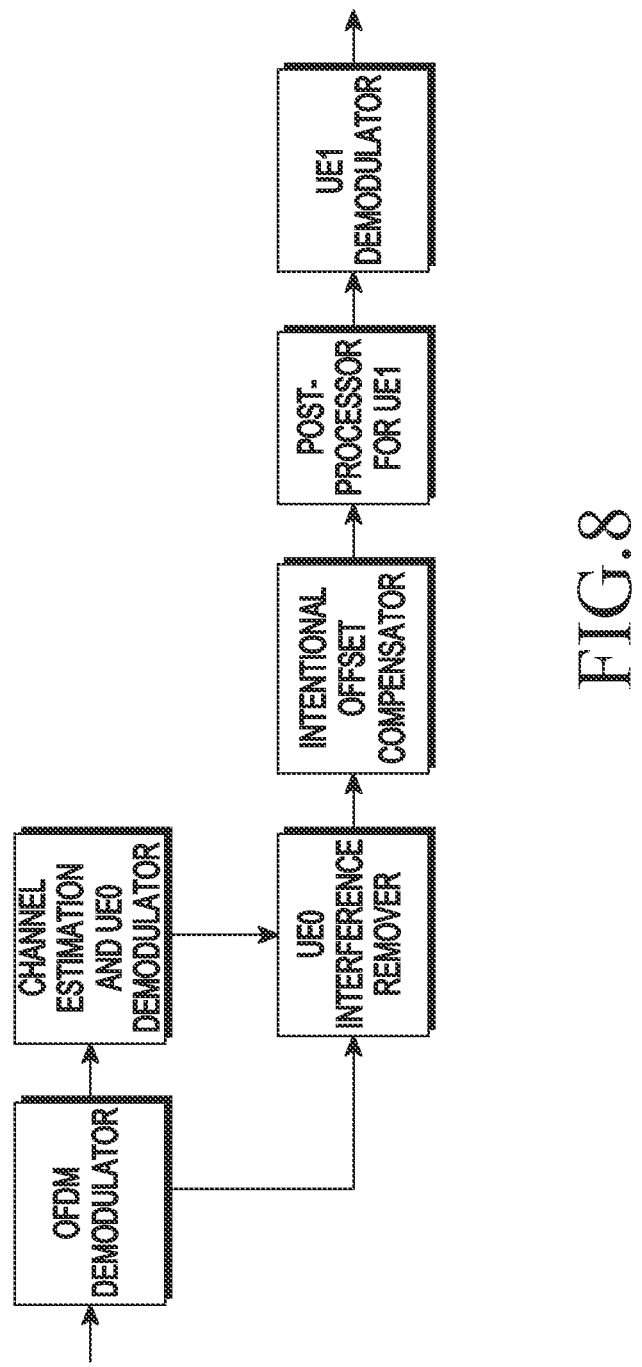
FIG. 8 is a block diagram illustrating a UE in an FA-NOMA system using a frequency offset according to an embodiment of the disclosure.

FIG. 8 is a block diagram illustrating a UE in an FA-NOMA system using a frequency offset according to an embodiment of the disclosure.

Referring to FIG. 8, an embodiment of the disclosure may include some operations of a UE. FIG. 8 illustrates blocks for signal decoding of the first UE (UE1). The decoding by UE1 may be performed by either the second UE (UE0) and UE1, and is thus not specified as an operation of a specific UE. In other words, the signal decoding by a UE illustrated in FIG. 8 is not limited as an operation of a specific UE but may rather be applied to all UEs that receive pre-processed data signals, to which an intentional offset is applied, in the FA-NOMA system according to an embodiment. Described below is the first UE receiving pre-processed, intentional offset-applied data signals in the FA-NOMA system.

The first UE may receive a signal including at least one pilot, and may perform channel estimation based on the frequency-axis signal received through the OFDM demodulator.

The first UE may demodulate the signal of the second UE (UE0) and remove the demodulated signal from the received signal. In other words, the first UE may demodulate the second UE (UE0) signal, which is the second signal transmitted to the second UE, and obtain the first signal, which is transmitted to the first UE, by a method of removing the demodulated second signal from the received signal including at least one pilot. There may be included a process for performing channel compensation based on the channel value estimated while removing interference and demodulating the signal of the second UE.

Since the residual signal is a signal of the first UE (UE1) transmitted, with an intentional frequency offset generated, the first UE may perform compensation for removing the intentional frequency offset through an intentional frequency offset remover. In other words, compensation may be performed on the residual signal corresponding to the obtained first signal to remove the frequency offset using the information for the frequency offset received from the base station.

The first UE may perform post-processing on the frequency offset-compensated first signal using at least one post-processing factor. In other words, the at least one post-processing factor may be a factor determined based on at least one pre-processing factor previously received from the base station. The at least one post-processing factor may be a matrix, and the at least one post-processing factor may be a Hermitian matrix of the at least one pre-processing factor. Accordingly, the first UE may perform post-processing to multiply $C^H$ which is the Hermitian matrix of the at least one pre-processing factor (proposed pre-processing matrix). At least one post-processing factor (post-processing matrix $C^H$) may be obtained by each UE using information broadcast by the base station through a control channel.

The first UE may obtain a demodulated first signal by demodulating the post-processed signal.

By the above-described method, multiple UEs may stably receive pilot symbols in an FA-NOMA system in which different intentional frequency offsets are applied to data symbols of the UEs, and the data symbols are then transmitted. Thus, the channel estimation performance of UE may be enhanced.

3. A Method for Designing a Frame Structure for Interference Avoidance.

The third method for channel estimation in the FA-NOMA system is to generate no intentional frequency offset for time-axis OFDM symbols for transferring pilot symbols. This is a method for selectively applying an intentional frequency offset depending on the time-axis OFDM symbol index.

In a case where no intentional frequency offset is applied to the pilot symbol-embedded OFDM symbol, even when the transmission signals of multiple UEs are superposed and transmitted, FA-NOMA pilot contamination does not occur since no data symbol is in the same subcarrier position of a different UE as the pilot symbol-embedded subcarrier position. Thus, it is possible to obtain the channel estimation performance expected in the NOMA system of the related art.

Figure 9:
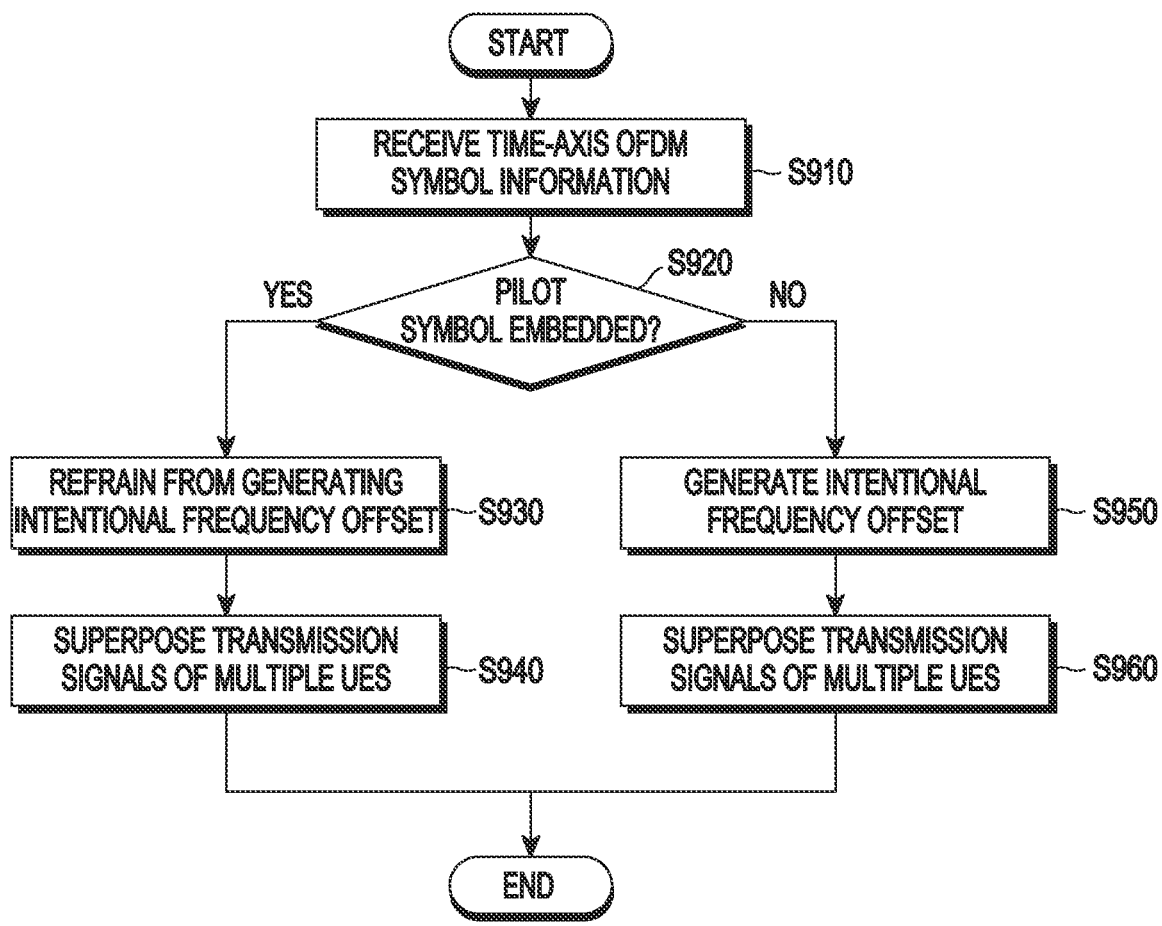
FIG. 9 is a flowchart illustrating a method for a base station to transmit a signal in an FA-NOMA system using a frequency offset according to an embodiment of the disclosure.

FIG. 9 is a flowchart illustrating a method for a base station to transmit a signal in an FA-NOMA system using a frequency offset according to an embodiment of the disclosure.

Referring to FIG. 9, a base station may receive time-axis OFDM symbol information at operation S910. The base station may determine whether the signals transmitted to the UEs via the received OFDM symbol information include a pilot at operation S920. If the signals transmitted to the UEs include a pilot, the base station may transmit signals, to which no intentional frequency offset is applied, for signals including at least one pilot at operation S930. In other words, the base station may superpose transmission signals for two or more (multiple) UEs without applying frequency offset and transmit them at operation S940. Since no frequency offset has been applied to signals including at least one pilot, contamination (i.e., interference) of at least one pilot by the frequency offset may be prevented. If the signals transmitted to the UEs include no pilot, the base station may apply an intentional frequency offset to the signals and transmit the signals to the UEs at operation S950. In other words, the base station may apply a frequency offset and superpose and transmit transmission signals for two or more (multiple) UEs at operation S960.

The process illustrated in FIG. 9 may be executed by the controller of the base station.

The controller of the base station may configure time-axis OFDM symbol information to be transmitted next. The configured OFDM symbol information may include information for whether a pilot symbol is to be embedded in the OFDM symbol to be transmitted next. The base station may determine whether to generate a frequency offset for the OFDM symbol to be transmitted next, using the information for whether to embed a pilot symbol. For pilot symbol-embedded OFDM symbols, the base station does not generate an intentional frequency offset but may superpose the transmission signals of the multiple UEs and transmit them to the UEs. For OFDM symbols in which no pilot symbol is embedded, the base station may generate an intentional frequency offset and superpose the transmission signals of the multiple UEs and transmit them to the UEs.

By the above-described method, multiple UEs may stably receive pilot symbols in an FA-NOMA system in which different intentional frequency offsets are applied to data symbols of the UEs, and the data symbols are then transmitted. Thus, the channel estimation performance of UE may be enhanced.

Figure 10:
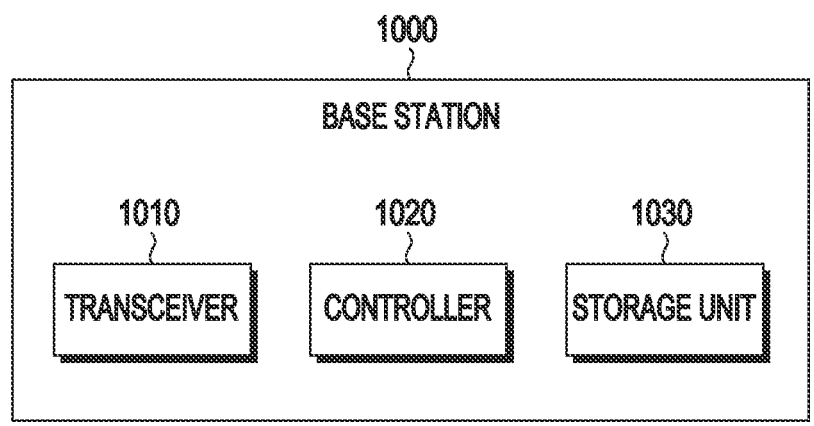
FIG. 10 is a view illustrating an internal configuration of a base station in an FA-NOMA system using a frequency offset according to an embodiment of the disclosure.

FIG. 10 is a view illustrating an internal configuration of a base station in an FA-NOMA system using a frequency offset according to an embodiment of the disclosure.

Referring to FIG. 10, a base station 1000 may include a transceiver 1010, a controller 1020, and a storage unit 1030.

The base station 1000 may perform the operations illustrated in FIGS. 3, 5 and 9.

The controller 1020 may be a processor or a communicator. Operations according to various embodiments may be performed under the control of the controller. For example, the operations illustrated in FIGS. 3, 4, 5 and 9 may be performed through the controller 1020. The controller 1020 may identify an offset to be applied to a transmission signal of a first UE, identify interference information caused by the offset based on the identified offset, determine a pilot symbol to be actually transmitted by removing interference information caused by the offset from the pilot symbol included in a second UE based on the interference information caused by the identified offset, and increase the magnitude of the interference signal (interference vector)-removed pilot symbol by a power boost.

The transceiver 1010 may transmit and receive signals. The transceiver 1010 may transmit a signal including the actually transmitted pilot symbol determined by the controller 1020 to the first UE and the second UE. The transceiver 1010 may transmit index information for pilot subcarriers, offset information applied to the transmission signal of the first UE, and information for the total number of subcarriers through a control channel.

The storage unit 1030 may store one or more pieces of information. The storage unit 1030 may store the offset to be applied to the transmission signal of the first UE, interference information caused by the offset, power boost information, index information for pilot subcarriers, offset information applied to the transmission signal of the first UE, and information for the total number of subcarriers.

The configuration of the base station 1000 is not limited to that shown in FIG. 10. For example, the base station 1000 may further include a pilot sequence generator, a multiplexer, an intentional offset generator, or an OFDM signal generator.

Figure 11:
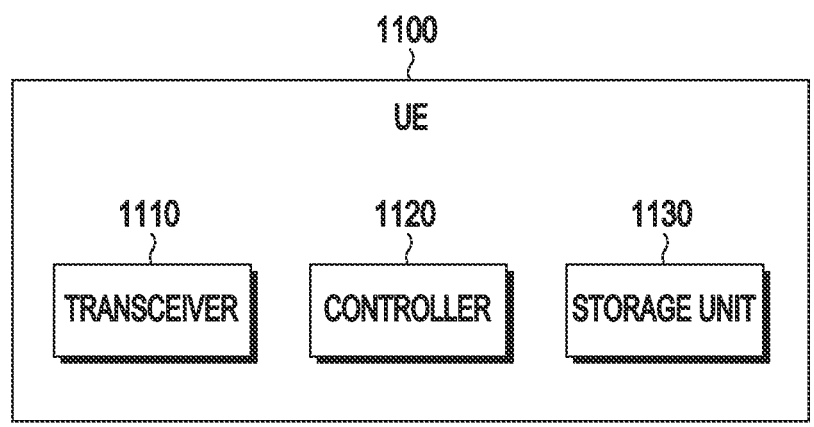
FIG. 11 is a view illustrating a UE in an FA-NOMA system using a frequency offset according to an embodiment of the disclosure.

FIG. 11 is a view illustrating an internal configuration of a UE in an FA-NOMA system using a frequency offset according to an embodiment of the disclosure.

Referring to FIG. 11, a UE 1100 may include a transceiver 1110, a controller 1120, and a storage unit 1130.

The UE 1100 may perform the operations illustrated in FIGS. 7 and 8.

The transceiver 1110 may transmit and receive signals. The transceiver 1110 may receive a signal including a pilot from the base station 1000. The signal including the pilot may include a UE0 symbol and a UE1 symbol. The transceiver 1110 may receive, from the base station 1000 through a control channel, index information for pilot subcarriers, offset information applied to the transmission signal of the first UE, and information for the total number of subcarriers.

The controller 1120 may be a processor or a communicator. Operations according to various embodiments may be performed under the control of the controller. For example, the controller 1120 may estimate a channel based on the signal including the pilot, and may obtain a UE signal by demodulating the UE signal based on the signal including the pilot.

The storage unit 1130 may store one or more pieces of information. The storage unit 1130 may store the obtained UE signal, index information for pilot subcarriers, offset information applied to the transmission signal of the first UE, and information for the total number of subcarriers.

The above-described operations may be realized by equipping a memory device retaining their corresponding codes in an entity, function, base station, load manager, or any component of a terminal in a communication system. In other words, the controller in the entity, the function, the base station, the load manager, or the terminal may execute the above-described operations by reading and executing the program codes stored in the memory device by a processor or central processing unit (CPU).

As described herein, various components or modules in the entity, function, eNB, load manager, or UE may be operated using a hardware circuit, e.g., a complementary metal oxide semiconductor-based logic circuit, firmware, software, and/or using a hardware circuit, such as a combination of hardware, firmware, and/or software embedded in a machine-readable medium. As an example, various electric structures and methods may be executed using electric circuits, such as transistors, logic gates, or application-specific integrated circuits (ASICs).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting a signal by a base station in a frequency-asynchronous non-orthogonal multiple access (FA-NOMA) system, the method comprising:
    generating a first symbol signal comprising first modulation symbols for a first user equipment (UE) and pilot symbols;
    generating a second symbol signal comprising second modulation symbols for a second UE without at least one pilot symbol;

identifying that the first symbol signal includes the pilot symbols;
determining the first symbol signal to which no frequency offset is applied based on identifying that the first symbol signal includes the pilot symbols;
identifying that the second symbol signal does not include at least one pilot symbol;
determining the second symbol signal to which a frequency offset is applied based on identifying that the second symbol signal does not include at least one pilot symbol;
pre-processing the second symbol signal based on a pre-processing matrix;
applying the frequency offset to the pre-processed symbol signal to generate a third symbol signal;
performing inverse fast fourier transform (IFFT) of the first symbol signal and the third symbol signal to generate an orthogonal frequency division multiplexing (OFDM) signal; and
transmitting the OFDM signal to the first UE and the second UE,
wherein the pre-processing matrix is determined based on information about interference caused to the pilot symbols by the frequency offset.

2. The method of claim 1, wherein the frequency offset is less than or equal to 0.5 times a preset subcarrier spacing.

3. The method of claim 1, wherein the pre-processing matrix is determined to mitigate the interference caused to subcarrier positions of the pilot symbols by the third symbol signal to which the frequency offset is applied.

4. The method of claim 1, further comprising:
broadcasting information about the pre-processing matrix through a control channel.

5. The method of claim 4, wherein the information about the pre-processing matrix comprises at least one of subcarrier index information of the pilot symbols, information of the frequency offset, information of a total number of subcarriers, or information of elements of the pre-processing matrix.

6. A base station in a frequency-asynchronous non-orthogonal multiple access (FA-NOMA) system, the base station comprising:
a transceiver; and
at least one processor coupled with the transceiver and configured to:
generate a first symbol signal comprising first modulation symbols for a first user equipment (UE) and pilot symbols,
generate a second symbol signal comprising second modulation symbols for a second UE without at least one pilot symbol,
identify that the first symbol signal includes the pilot symbols,
determine the first symbol signal to which no frequency offset is applied based on identifying that the first symbol signal includes the pilot symbols,
identify that the second symbol signal does not include at least one pilot symbol,
determine the second symbol signal to which a frequency offset is applied based on identifying that the second symbol signal does not include at least one pilot symbol,
pre-process the second symbol signal based on a pre-processing matrix,
apply the frequency offset to the pre-processed symbol signal to generate a third symbol signal,
performing inverse fast fourier transform (IFFT) of the first symbol signal and the third symbol signal to generate an orthogonal frequency division multiplexing (OFDM) signal, and
transmit the OFDM signal to the first UE and the second UE,
wherein the pre-processing matrix is determined based on information about interference caused to the pilot symbols by the frequency offset.

7. The base station of claim 6, wherein the frequency offset is less than or equal to 0.5 times a preset subcarrier spacing.

8. The base station of claim 6, wherein the pre-processing matrix is determined to mitigate the interference caused to subcarrier positions of the pilot symbols by the third symbol signal to which the frequency offset is applied.

9. The base station of claim 6, wherein the at least one processor is further configured to control the transceiver to broadcast information about the pre-processing matrix through a control channel.

10. The base station of claim 9, wherein the information about the pre-processing matrix comprises at least one of subcarrier index information of the pilot symbols, information of the frequency offset, information of a total number of subcarriers, or information of elements of the pre-processing matrix.

* * * * *